United States Patent
Teo et al.

(10) Patent No.: US 11,815,872 B2
(45) Date of Patent: Nov. 14, 2023

(54) SYSTEMS, METHODS AND COMPUTER PROGRAM PRODUCTS FOR AUTOMATED REVISION COMPARISON OF ENGINEERING DATA IN PROCESS CONTROL SYSTEMS

(71) Applicant: Yokogawa Electric Corporation, Tokyo (JP)

(72) Inventors: Wilfred Woon Yew Teo, Singapore (SG); Chin Wei Chia, Singapore (SG); Thin Sapal Yu, Singapore (SG); Yi Ee Loke, Singapore (SG); Jia Chin Tan, Singapore (SG); Efendi, Singapore (SG); Maricel Mercurio Bacacao, Singapore (SG); Daisuke Yasunami, Singapore (SG)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 310 days.

(21) Appl. No.: 17/191,079

(22) Filed: Mar. 3, 2021

(65) Prior Publication Data
US 2022/0283560 A1 Sep. 8, 2022

(51) Int. Cl.
*G06F 16/957* (2019.01)
*G05B 19/042* (2006.01)
*G06F 16/21* (2019.01)

(52) U.S. Cl.
CPC ....... *G05B 19/0425* (2013.01); *G06F 16/219* (2019.01); *G06F 16/9577* (2019.01)

(58) Field of Classification Search
CPC .......... G05B 19/0425; G06F 16/219; G06F 16/9577
See application file for complete search history.

(56) References Cited

U.S. PATENT DOCUMENTS

| | | | |
|---|---|---|---|
| 8,775,392 B1 * | 7/2014 | Walker | G06F 16/1734 707/695 |
| 2003/0036876 A1 * | 2/2003 | Fuller, III | G06Q 30/0601 702/127 |
| 2004/0260678 A1 * | 12/2004 | Verbowski | G06F 11/0706 |
| 2005/0033777 A1 * | 2/2005 | Moraes | G06F 16/27 |
| 2009/0282067 A1 * | 11/2009 | Bendigeri | G05B 19/042 717/136 |

(Continued)

FOREIGN PATENT DOCUMENTS

CN 110362056 A * 10/2019 ......... G05B 19/0426

*Primary Examiner* — Matthew J Ellis
(74) *Attorney, Agent, or Firm* — Sheridan Ross P.C.

(57) ABSTRACT

The invention enables automated revision comparison of engineering data within a process control system. In various embodiments, the invention achieves this by (i) receiving user input defining a set of data retrieval parameters that identify change-set data for an engineering data file, (ii) retrieving from among change-sets retrieved based on the data retrieval parameters, a first change-set and a second change-set, (iii) retrieving from an engineering database, first and second revisions of the engineering data file corresponding to the first change-set and the second change-set (iv) comparing the retrieved first and second revisions, and (v) displaying a deviation report that is generated based on the identified deviations between the first and second revisions.

22 Claims, 24 Drawing Sheets

(56) References Cited

U.S. PATENT DOCUMENTS

2016/0179828 A1* 6/2016 Ellis .................. G06F 16/122
                                                        707/695
2018/0231960 A1* 8/2018 Kambe ................ G06F 16/13
2020/0201831 A1* 6/2020 Shekhawat ............ G06F 8/71

* cited by examiner

| From | To | Deviation Status | Target Data | Last modified user |
|---|---|---|---|---|
| 1 | 17 | Modified | Process_IO_1 | AdminUser |
| - | 16 | Added | GR0002 | AdminUser |
| 5 | 14 | No Change | GR0003 | AdminUser |
| 7 | 11 | Deleted | IO_definition | AdminUser |

1. Deviation Overview

1.1 Report Creation Condition

- Date Time and Creator

From/To

| Item | Value |
    |---|---|
    | From Date Time | 1/1/2021 10:24:49 AM |
    | To Date Time | 1/2/2021 10:24:49 AM |
    | Creation Date Time | 1/7/2021 10:22:40 PM |
    | Created by | HIS0164\AdminUser |

- Target Engineering Items

Selected target items

| Item | Value | | | |
    |---|---|---|---|---|
    | AD Project Name | ADPJT 1 | | | |
    | System | VP | I/O-List | Process IO 1 | |
    | | | MYPJT1 | HIS0164 | GR0002 |

- Result Options

| Item | Value |
    |---|---|
    | Include added/deleted items | Yes |
    | Include unmodified items | Yes |

Check status of Result Options checkboxes

SYSTEMS, METHODS AND COMPUTER PROGRAM PRODUCTS FOR AUTOMATED REVISION COMPARISON OF ENGINEERING DATA IN PROCESS CONTROL SYSTEMS

FIELD OF THE INVENTION

The invention relates to the field of industrial automation and process control systems. More specifically, the invention provides, methods, systems and computer program products that enable automated revision comparison of engineering data within a process control system.

BACKGROUND OF THE INVENTION

Industrial environments implement control systems (for example, distributed process control systems) for running and controlling processes for manufacturing, conversion, or production. Control systems typically include one or more process controllers that are connected to one or more field devices. Field devices, may include valves, valve actuators, switches, and transmitters (e.g. temperature, pressure, level, and flow sensors) located within the industrial environment, and which are configured for physical control functions or process control functions. Examples of field device control functions include opening or closing valves, and measuring process and/or environmental parameters (e.g. temperature or pressure) for controlling one or more processes within the process plant or system.

At the other end, a process controller within the control system may be configured to receive signals generated by field devices, wherein the received signals convey information corresponding to process parameters measured by the field devices and/or other information concerning states of the field devices. The process controller may additionally execute a control application that implements one or more control modules for implementing process control decisions. Control modules within the process controller send control signals to field devices through control networks, to control operation of one or more of the field devices. Input-output (I/O) devices that are located as communication intermediaries between a process controller and one or more field devices enable data transfer and control instruction transfers between the process controller and the field devices, by converting electrical signals to digital values and by sending and receiving such signals over one or more communication protocols, such as HART, Profitbus or Foundation Fieldbus protocols.

A control system within a process plant may include one or more process controllers, and each controller is connected to one or more field devices via I/O cards and/or I/O ports. The one or more controllers store control applications and implement control strategies for the control and operation of field devices. The control system may be configured to track or collect data related to the various plant assets or plant equipment, including, but not limited to, field devices, rotating equipment and key machineries. The control system retrievably stores device-related data and/or performance data for all devices or assets in a plant or group of plants, for the purposes of monitoring the statuses and health of plant assets and conducting maintenance work. Additionally, the control system may be configured to serve as a communication intermediary between a plant operator or an operator terminal on one hand, and one or more field devices on the other hand—for the purposes of enabling efficient configuration, commissioning, inspection, and maintenance of such field devices.

For the purposes of the present written description, it will be understood that references to a "field device" may include references to any of valves, valve actuators, switches, transmitters, smart transmitters, positioners, or other sensor devices that may be located within an industrial process environment, and that may be configured for physical or process control functions. Field devices may include "smart" field devices—i.e. devices that support digital communication protocols such as HART or Foundation Fieldbus communication protocols.

For the purposes of the present written description, references to "control system(s)" shall be understood as references to any control system(s) that may be implemented within a process control environment, an industrial plant, or an industrial environment, and shall include distributed control systems (DCS) and/or safety control systems (SCS).

The process of engineering a plant or industrial process control system, involves defining and implementing a large number of modifications to engineering data corresponding to the process control system. As illustrated in FIG. 1, a typical database 100 of engineering data having engineering data files 102 stored therewithin, comprises multiple types of data files, for example any one or more of I/O lists 104, function blocks 106, operation sequences 108, alarms 110, graphic drawings 112, and/or other data file types 114. Further, several different files and file types may be modified during the engineering stage of the process control system, and yet further, one or more files may be iteratively modified several times.

As a result, process control systems require functionality that enables efficient review of changes made to engineering data, and also provide the ability to compare revision data corresponding to the engineering data. The objective is to enable a user or configuration engineer to verify any data inputs and data modifications that have been made, and with a view to implement necessary and expected data modifications to the engineering data.

A configuration engineering environment 200 for process control systems (of the kind shown in FIG. 2) achieves this through a history management function provided for engineering data. An engineering database 202 for storing and retrieving engineering data is managed by the configuration engineering environment 200, that retains the entire set of historical engineering data. As shown in FIG. 2, either one (or both) of an organizer module 204 and a viewer module 206 may be configured to enable a user to view and/or modify one or more of engineering data files 208, 210, which is retrieved from the engineering database 202. Each change to an engineering data file 208, 210 is stored as a historical record, and is associated with a change-set number and with information representing the type of change (e.g. added/deleted/modified/no-change). A change-set shall be understood as a data record (or a set of data records) representing a set of interrelated changes or modifications that are treated as a group. A single change-set can contain modifications made to multiple files. All changes or modifications within a single change-set are associated with a single change-set number corresponding to that change-set. For each change to an engineering data file, the engineering database 202 stores the entire contents of each modified data file, instead of only storing the actual change.

The organizer module 204 may be configured to provide functionality to find and retrieve revision history records of each engineering data file, within a revision history window.

The organizer module 204 may be configured to display a list of change-sets created by different check-ins. When a revision history window is launched for a single target file, a user can compare two revisions of the target file, by selecting two change-sets from the list of change-sets and comparing them.

The viewer module 206 may also be configured to communicate with a graphic builder 212, wherein the graphic builder 212 comprises a processor implemented module configured to generate graphic files comprising one or more graphic representations of process control system equipment such as vessels, pumps, valves and piping. The graphic builder 212 may be launched from within the viewer module 206 or may be launched in stand-alone mode, and provides a palette of stencils and drawing tools to enable a configuration engineer or other user to generate graphic files and to edit parameter values or attribute values corresponding to the components or equipment represented within the generated graphic file.

Such configuration engineering environment for process control systems may additionally include a comparison module of a kind illustrated in FIG. 3. As illustrated in FIG. 3, the configuration engineering environment 300 includes an engineering database 302, an organizer module 304 and a comparison module 306. A user or configuration engineer may first retrieve historical data 3042 representing changes made to one or more engineering data files via the organizer module 304, and may thereafter select one or more engineering data files for performing a comparison of changes made to the contents of that engineering data file over the course of multiple change-sets. The comparison module 306 only allows configuration engineer or user to compare and view deviations between two revisions of the same data file in a side-by-side format 3062, which means if the engineer needs to verify the modification, he or she is required to visit each property value within each data row within the comparison module 306 to verify highlighted deviations, and there is no status provided with respect to the modifications made.

In cases where a configuration engineer or user requires to review and compare changes made to graphic files, the task is more difficult, since prior art comparison module 306 does not provide for comparison of parameter values between two revisions of a graphic file. As illustrated in FIG. 4, the configuration engineer or user is therefore required to launch a graphic builder 404 from within the viewer module 402 so as to view each of the multiple revisions of a graphic file, and to manually identify and record the changes or deviations between the multiple revisions.

Existing revision comparison solutions provided within configuration engineering environments suffer from multiple disadvantages.

First, if a user or configuration engineer intends to review or verify specific modifications made between two revisions of a data file, they require to visit each property value within each data row within the comparison module 306 to verify highlighted deviations. The process of manual review of historical records is tedious and time consuming.

Second, a configuration engineer is required to submit a report that establishes that only necessary parts within a process control system have been modified, and that the impact of such modifications does not extend to any other parts or areas within the process control system. Existing solutions for generating the necessary report requires the configuration engineer to compare different revisions of an engineering data file and to identify and capture differences between two different revisions of the file manually, for the purpose of creating a deviation report. The manual report creation is time consuming and error-prone, especially when a large number of data files and/or a large number of modifications are involved.

Yet further, prior art solutions can only compare files supported by an organizer module—whereas graphic files are currently not supported by organizer modules. The lack of capabilities for efficiently comparing changes made across multiple revisions of graphic files also significantly increases the burden of review compliance on a configuration engineer or user.

There is accordingly a need for solutions that address these shortcomings in the existing state of art—and which provide efficient processes to identify modifications/deviations between revisions of a data file and to generate a report of such modifications/deviations that are made to data files within an engineering database, for the purposes of implementing a Factory Acceptance Test (FAT), during which engineering data files may be intensively being modified. It is also desirable to perform a thorough check of modifications made to the engineering data, and to prevent oversight of modifications and unnecessary modifications.

SUMMARY

The invention provides, methods, systems and computer program products that enable automated revision comparison of engineering data within a process control system.

In an embodiment, the invention comprises a processor implemented method for generating a deviation report identifying modifications made to engineering data within a process control system. The method comprises (i) receiving user input defining a set of data retrieval parameters that identify change-set data for an engineering data file, the set of data retrieval parameters including at least an opening range value and a closing range value defining a range of change-sets corresponding to the engineering data file, (ii) retrieving from among the change-sets falling within the defined range, a first change-set closest to the opening range value, and a second change-set closest to the closing range value, (iii) retrieving from an engineering database, a first revision of the engineering data file corresponding to the first change-set, (iv) retrieving from the engineering database, a second revision of the engineering data file corresponding to the second change-set, (v) comparing data values within data rows in the first revision of the engineering data file against corresponding data values within the same data rows in the second revision of the engineering data file, and identifying any deviations corresponding to each compared data value or data row, and (vi) displaying a deviation report on a display, wherein the deviation report is generated based on the deviations identified based on the comparison of data values from the first revision of the engineering data file and the second revision of the engineering data file.

In an embodiment of the method, the retrieval of the first and second revisions of the engineering data file is preceded by the steps of (i) parsing each of the first change-set and the second change-set, and (ii) detecting a deviation status between the first and second revisions of the engineering data file based on a comparison of data within the second change-set with data within the first change-set.

In a further embodiment of the method (i) each of the first change-set and the second change-set includes at least a unique change-set identifier, and a deviation status representing a category of a data file revision which such change-set records, (ii) and parsing each of the first change-set and the second change-set comprises (a) retrieving a first unique change-set identifier and a first category of a data file revision, each corresponding to the first change-set, and (b) retrieving a second unique change-set identifier and a second category of a data file revision, each corresponding to the second change-set.

In another method embodiment, detecting the deviation status between the first and second revisions of the engineering data file comprises (i) ascertaining whether a deviation status of a later change-set among the first and second change-sets is different from a deviation status of an earlier change-set among the first and second change-sets, and (ii) responsive to ascertaining that the deviation status of the later change-set is different from the deviation status of the earlier change-set, determining that the deviation status between the first and second revisions of the engineering data file represents a deviation between the two change-sets.

The method may include an embodiment wherein the deviation status between the first and second revisions of the engineering data file is determined prior to the analysis of contents of either one of the first and second revisions of the engineering data file.

In another embodiment the method further comprises displaying the detected deviation status within a user interface as a preview deviation status between the first and second revisions of the engineering data file.

In a particular method embodiment (i) the engineering data file is a graphic file representing a graphic drawing corresponding to engineering data within the process control system, (ii) the first revision of the engineering data file that is retrieved from the engineering database comprises a first revision of an XML file that defines the attributes of the graphic drawing, the first revision of the XML file corresponding to the first change-set, and (iii) the second revision of the engineering data file that is retrieved from the engineering database comprises a second revision of the XML file that defines the attributes of the graphic drawing, the second revision of the XML file corresponding to the second change-set.

In a further embodiment of the method (i) the first revision of the XML file enables rendering of a first revision of the graphic drawing, and (ii) the second revision of the XML file enables rendering of a second revision of the graphic drawing.

In a specific method embodiment, (i) each row within the first revision and the second revision of the XML files represents a distinct graphic object within the graphic drawing, and (ii) each column within the first revision and the second revision of the XML files represents a distinct attribute of a graphic object within the graphic drawing.

In a method embodiment, identifying any deviations corresponding to each compared data value or data row comprises comparing data values within data rows in the first revision of the XML file against corresponding data values within the same data rows in the second revision of the XML file, and the deviations identified represent deviations between attributes of the distinct graphic object within the graphic drawing.

The invention also provides a system for generating a deviation report identifying modifications made to engineering data within a process control system. The system comprises a memory, and a processor. The processor is configured for (i) receiving user input defining a set of data retrieval parameters that identify change-set data for an engineering data file, the set of data retrieval parameters including at least an opening range value and a closing range value defining a range of change-sets corresponding to the engineering data file, (ii) retrieving from among the change-sets falling within the defined range, a first change-set closest to the opening range value, and a second change-set closest to the closing range value, (iii) retrieving from an engineering database, a first revision of the engineering data file corresponding to the first change-set, (iv) retrieving from the engineering database, a second revision of the engineering data file corresponding to the second change-set, (v) comparing data values within data rows in the first revision of the engineering data file against corresponding data values within the same data rows in the second revision of the engineering data file, and identifying any deviations corresponding to each compared data value or data row, and (vi) displaying a deviation report on a display, wherein the deviation report is generated based on the deviations identified based on the comparison of data values from the first revision of the engineering data file and the second revision of the engineering data file.

In an embodiment of the system the processor is configured such that retrieval of the first and second revisions of the engineering data file is preceded by (i) parsing each of the first change-set and the second change-set, and (ii) detecting a deviation status between the first and second revisions of the engineering data file based on a comparison of data within the second change-set with data within the first change-set.

In another embodiment of the system the processor is configured such that (i) each of the first change-set and the second change-set includes at least a unique change-set identifier, and a deviation status representing a category of a data file revision which such change-set records, and (ii) and parsing each of the first change-set and the second change-set comprises (a) retrieving a first unique change-set identifier and a first category of a data file revision, each corresponding to the first change-set, and (ii) retrieving a second unique change-set identifier and a second category of a data file revision, each corresponding to the second change-set.

In a specific system embodiment, the processor is configured such that detecting the deviation status between the first and second revisions of the engineering data file comprises (i) ascertaining whether a deviation status of a later change-set among the first and second change-sets is different from a deviation status of an earlier change-set among the first and second change-sets, and (ii) responsive to ascertaining that the deviation status of the later change-set is different from the deviation status of the earlier change-set, determining that the deviation status between the first and second revisions of the engineering data file represents a deviation between the two change-sets.

In another embodiment of the system, the processor is configured such that the deviation status between the first and second revisions of the engineering data file is determined prior to the analysis of contents of either one of the first and second revisions of the engineering data file.

In a particular system embodiment, the processor is configured to display the detected deviation status within a user interface as a preview deviation status between the first and second revisions of the engineering data file.

In an embodiment of the system (i) the engineering data file is a graphic file representing a graphic drawing corresponding to engineering data within the process control system, (ii) the first revision of the engineering data file that is retrieved from the engineering database comprises a first revision of an XML file that defines the attributes of the graphic drawing, the first revision of the XML file corresponding to the first change-set, and (iii) the second revision of the engineering data file that is retrieved from the engineering database comprises a second revision of the XML file that defines the attributes of the graphic drawing, the second revision of the XML file corresponding to the second change-set.

In another embodiment of the system, the processor is configured such that (i) the first revision of the XML file enables rendering of a first revision of the graphic drawing, and (ii) the second revision of the XML file enables rendering of a second revision of the graphic drawing.

In one embodiment of the system, the processor is configured such that (i) each row within the first revision and the second revision of the XML files represents a distinct graphic object within the graphic drawing, and (ii) each column within the first revision and the second revision of the XML files represents a distinct attribute of a graphic object within the graphic drawing.

In a system embodiment, the processor is configured for identifying any deviations corresponding to each compared data value or data row by comparing data values within data rows in the first revision of the XML file against corresponding data values within the same data rows in the second revision of the XML file, and the deviations identified represent deviations between attributes of the distinct graphic object within the graphic drawing.

The invention additionally provides computer program products for generating a deviation report identifying modifications made to engineering data within a process control system. The computer program product comprises a non-transitory computer usable medium having a computer readable program code embodied therein, the computer readable program code comprising instructions for implementing within a processor based computing system, the steps of (i) receiving user input defining a set of data retrieval parameters that identify change-set data for an engineering data file, the set of data retrieval parameters including at least an opening range value and a closing range value defining a range of change-sets corresponding to the engineering data file, (ii) retrieving from among the change-sets falling within the defined range, a first change-set closest to the opening range value, and a second change-set closest to the closing range value, (iii) retrieving from an engineering database, a first revision of the engineering data file corresponding to the first change-set, (iv) retrieving from the engineering database, a second revision of the engineering data file corresponding to the second change-set, (v) comparing data values within data rows in the first revision of the engineering data file against corresponding data values within the same data rows in the second revision of the engineering data file, and identifying any deviations corresponding to each compared data value or data row, and (vi) displaying a deviation report on a display, wherein the deviation report is generated based on the deviations identified based on the comparison of data values from the first revision of the engineering data file and the second revision of the engineering data file.

In an embodiment of the computer program product (i) the engineering data file is a graphic file representing a graphic drawing corresponding to engineering data within the process control system, (ii) the first revision of the engineering data file that is retrieved from the engineering database comprises a first revision of an XML file that defines the attributes of the graphic drawing, the first revision of the XML file corresponding to the first change-set, and (iii) the second revision of the engineering data file that is retrieved from the engineering database comprises a second revision of the XML file that defines the attributes of the graphic drawing, the second revision of the XML file corresponding to the second change-set.

The computer readable program code of the computer program product may comprise instructions for implementing within a processor based computing system, any of the one or more methods described in detail within this specification.

BRIEF DESCRIPTION OF THE ACCOMPANYING DRAWINGS

FIGS. 9 to 11 illustrate aspects of implementing the method of FIG. 7A.

FIGS. 14 to 22 illustrate embodiments of deviation reports generated in accordance with the teachings of the present invention.

DETAILED DESCRIPTION

The invention provides, methods, systems and computer program products that enable automated revision comparison of engineering data within a process control system.

Figure 1:
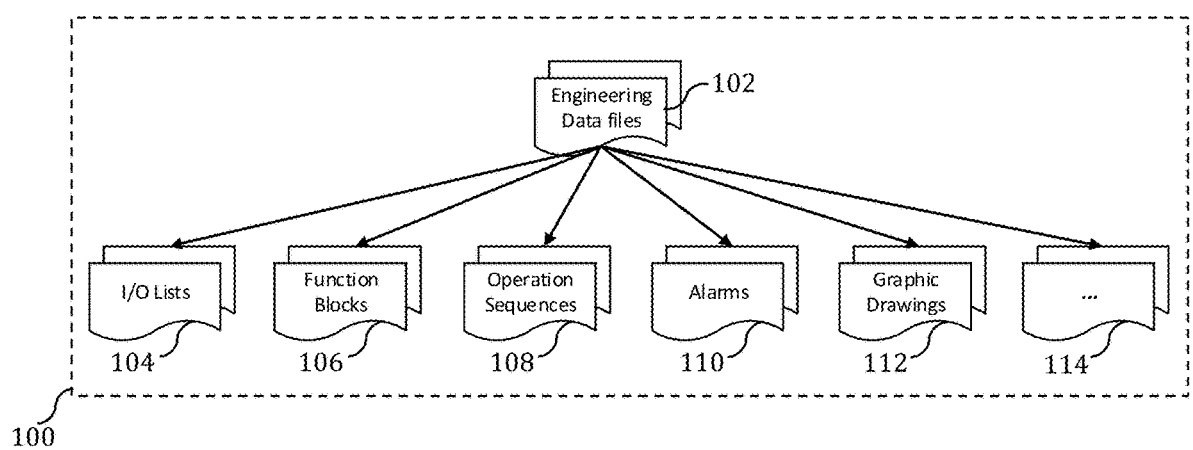
FIG. 1 illustrates engineering data of a kind typically stored in an engineering database.
Figure 2:
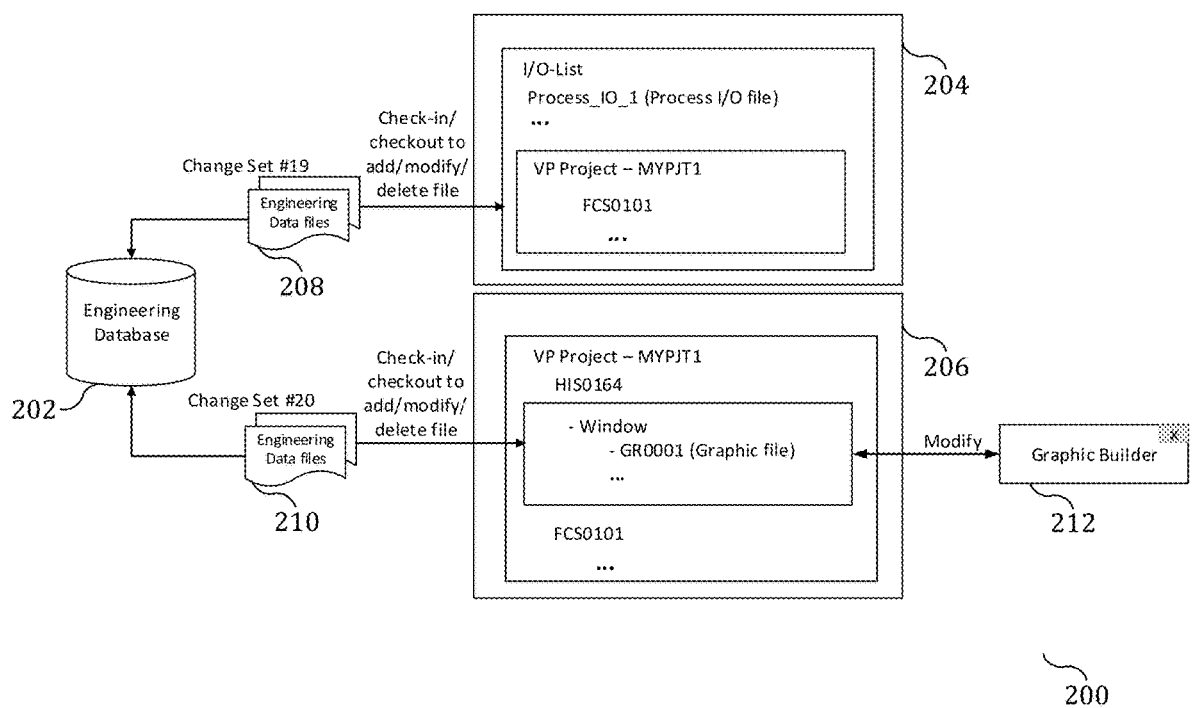
FIGS. 2 to 4 illustrates a configuration engineering environment for process control systems which includes a history management function and components thereof.
Figure 3:
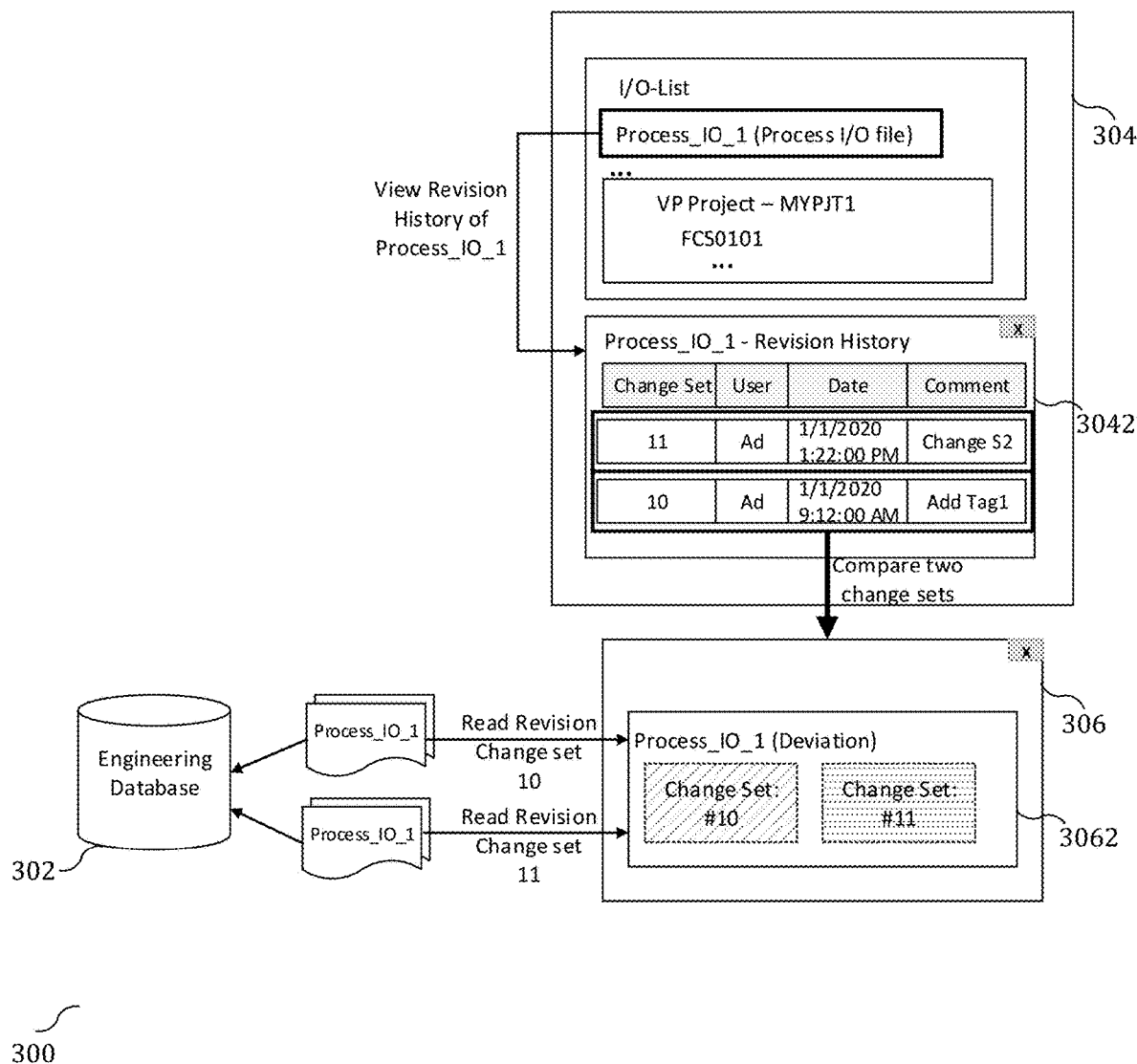
Figure 4:
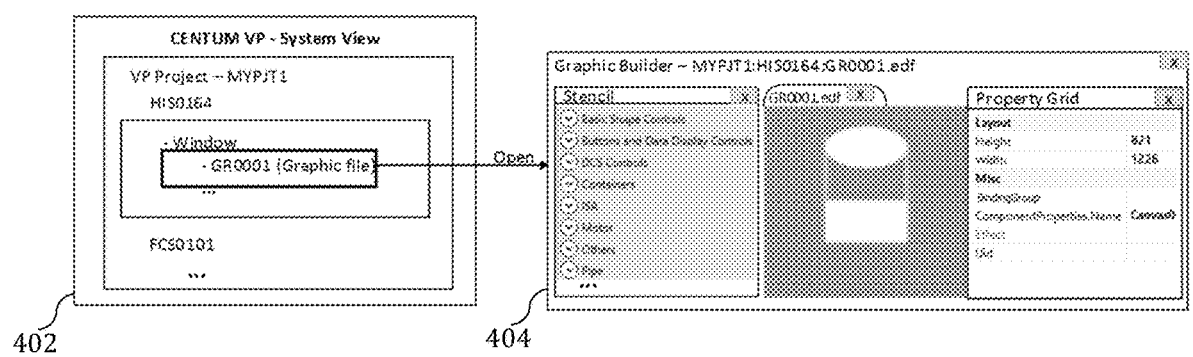
Figure 5:
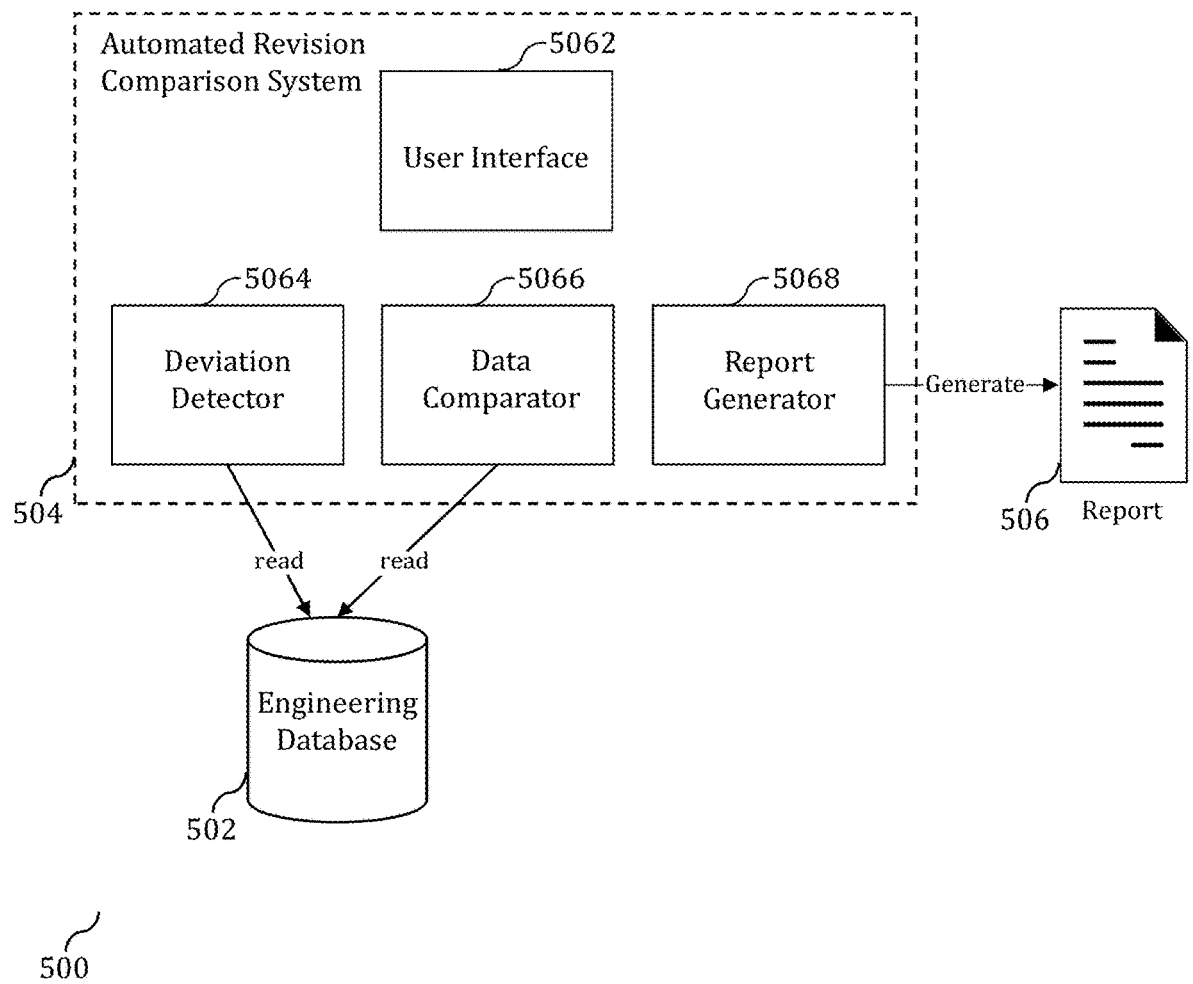
FIG. 5 illustrates a system configured for enabling automated revision comparison of engineering data within a process control system, in accordance with the teachings of the present invention.

FIG. 5 illustrates a system 500 configured for enabling automated revision comparison of engineering data within a process control system. System 500 comprises engineering database 502, and a processor implemented automated revision comparison system 504. Automated revision comparison system 504 comprises processor implemented user interface 5062, processor implemented deviation detector 5064, processor implemented data comparator 5066 and processor implemented report generator 5068—which may be configured to enable generation of a report 506 identifying deviations between two revisions of a data file, that are stored within engineering database 502. The functionalities of each of the components of automated revision comparison system 504 are described in more detail subsequently.

Figure 8:
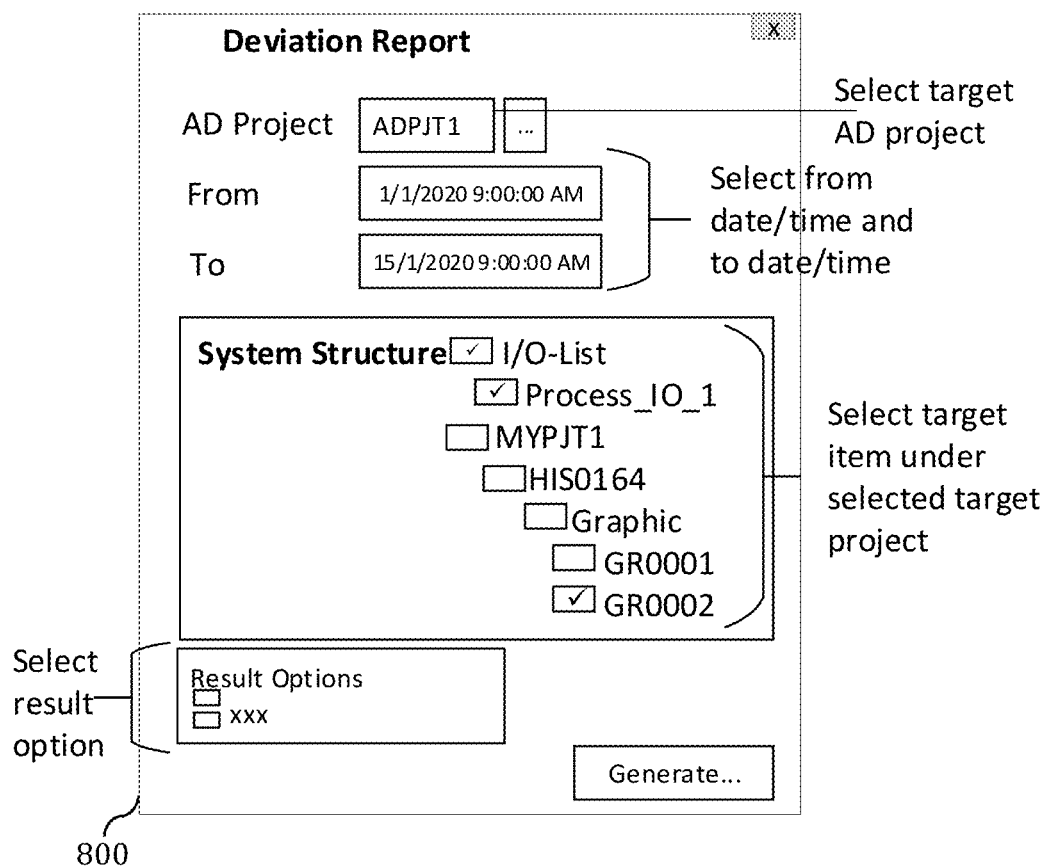
FIG. 8 illustrates an exemplary user interface within an automated revision comparison system.

The automated revision comparison system 504 of FIG. 5 enables generation of the report 506, which identifies deviations between two revisions of a data file. As a first step towards generating report 506, a configuration engineer may select a target project (a target project is an automation design project, could be regarded as an engineering project, which stores engineering data edited in an engineering tool of an automation engineering system), target engineering data items within the target project, exemplary target engineering data items may include process I/O file, graphic files, and date/time ranges for selecting revisions of a data file for detecting modifications or deviations by comparing said revisions. FIG. 8 illustrates an exemplary user interface 800 of a kind that allows a configuration engineer to make the above described selections. It will be understood that while an engineering data item may be displayed as a single data item within the user interface 800, it may in fact includes a plurality of data files. By way of example, a process I/O file may include a main data file, nestloading signal files (i.e. when a signal is assigned to a project, it will create a different file by referring to its main process I/O), user defined column file, etc.

The user interface 800 may additionally be configured to allow the configuration engineer to specify additional filter parameters for more flexible result options for presenting the deviations between revisions of data files that are compared. In various embodiments, the filter parameters may include parameters specifying the type of data file modifications (e.g. added/deleted/no change) to be identified for retrieval from an engineering database. In an embodiment, the default option is that all modified data files are retrieved. However, retrieval can optionally be controlled in a more fine-grained manner based on parameters specifying the type of data file modifications that require to be retrieved for generation of deviation reports. This flexibility enables a configuration engineer to filter deviation items according to the various configuration requirements. Once the target engineering data items that satisfy the specified target date/time ranges and other specified parameters are retrieved from an engineering database, deviations or modifications between revisions of such target engineering data items can be identified for the purposes of generation of a deviation report.

Prior to actual generation of a deviation report, the configuration engineer is provided with preview functionality to ascertain or verify the deviation status of each target file.

Figure 6:
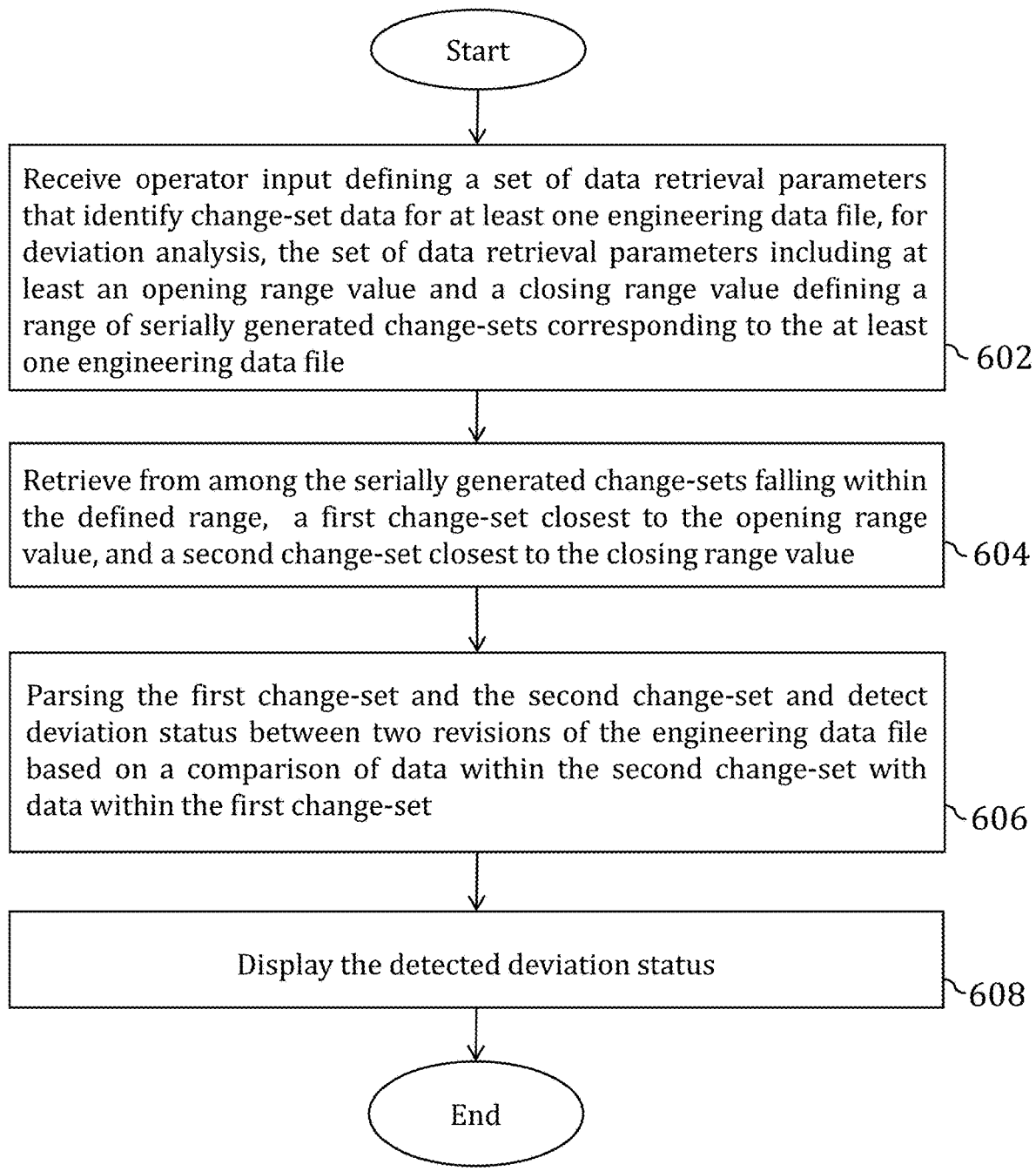
FIG. 6 illustrates a method for previewing deviations based on change-set data in accordance with the teachings of the present invention.

FIG. 6 illustrates a method for previewing deviations based on change-set data in accordance with the teachings of the present invention. In an embodiment of the invention, one or more steps of the method of FIG. 6 may be implemented within automated revision comparison system 504, or within deviation detector 5064 of FIG. 5.

Step 602 comprises receiving user input defining a set of data retrieval parameters that identify change-set data for at least one engineering data file, for deviation analysis. The set of data retrieval parameters may include at least an opening range value and a closing range value defining a range of change-sets corresponding to the at least one engineering data file. The opening and closing range values may comprise date and/or time values. In an embodiment, the user input may be received through user interface 5062 of FIG. 5.

Step 604 comprises retrieving from among the change-sets falling within the defined range, a first change-set closest to the opening range value, and a second change-set closest to the closing range value. Step 604 may be implemented by deviation detector 5064 and the change-sets may be retrieved from engineering database 502 of FIG. 5.

Step 606 comprises parsing the first change-set and the second change-set and detecting deviation status between two revisions of the engineering data file—wherein the deviation status is detected based on a comparison of data within the second change-set against data within the first change-set. Step 606 may be implemented by data comparator 5066 of FIG. 5. The implementation of the parsing and comparisons (for example, by data comparator 5066) are explained below.

Each change-set (i.e. a set of data records representing a set of interrelated changes or modifications made to multiple engineering files) includes at least, a change-set number, and a deviation status of the change-set, and optionally a time stamp associated with the change-set. The change-set number comprises a unique change-set identifier (e.g. a numeric, alphanumeric or alphabetical string) that is uniquely associated with the change-set. The deviation status comprises information representing the "type" or "category" of data file revision(s) that have been grouped within a specific change-set (or which the specific change-set records). Exemplary deviation statuses for a change-set may comprise any one from the following, "added", "deleted", "modified" or "no change". The time stamp comprises date and/or time data representing a time at which changes that have been grouped within a specific change-set were implemented.

The step of parsing the first and second change-sets may in an embodiment comprise retrieving the unique change-set number or change-set identifier and the deviation status and optionally the time stamp corresponding to each of the first and second change-sets. Thereafter, the step of detecting a deviation status between the two revisions of an engineering data file corresponding respectively to the first and second change-sets, comprises comparing the parsed deviation statuses of the first and second change-sets and (i) identifying the later of the two change-sets (for example, based on the respective time-stamps of the two), (ii) ascertaining whether the deviation status of the later change-set is different from the deviation status of the earlier change-set, and (iii) responsive to ascertaining that the deviation status of the later change-set is different from the deviation status of the earlier change-set, determining that there is a deviation between the two change-sets. So for example, if the deviation status of an earlier change-set is "added" and the deviation status of a later change-set is "modified" then step 606 will result in a determination that there is a deviation between the two change-sets. It will be understood that step 606 enables a quick determination of the deviation status between two revisions of an engineering data file—and that such determination of the deviation status between two revisions of an engineering data file could be performed prior to the (i.e. can be implemented without) retrieval and/or analysis of contents of either one of the two revisions of the engineering data file. In an embodiment, the deviation status between two revisions of an engineering data file that is determined at step 606 is a preview deviation status—which may be used as an indicator of whether there is at all any deviation between two revisions of an engineering data file—and in an optional embodiment, the invention may proceed further with an actual comparative analysis of the contents of the first and second revisions of the engineering data file, only if the preview deviation status indicates that there is a deviation between two revisions of an engineering data file.

Step 608 comprises displaying a detected deviation status (that has been detected based on comparison of the first change-set and second change-set)—for example, within a preview window of user interface 5062 of FIG. 5.

Figure 10:
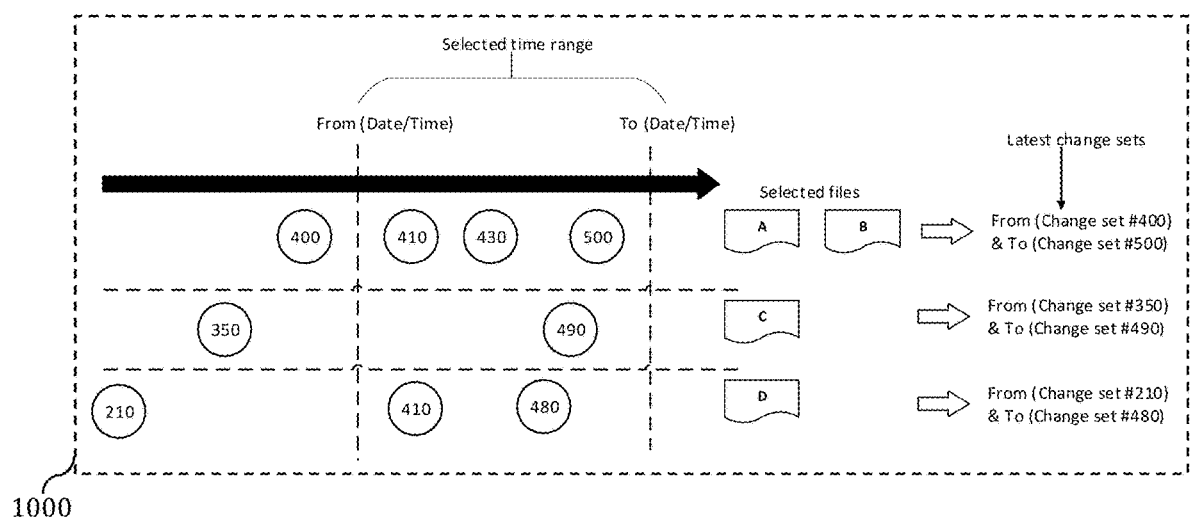

The user interface of the kind described in connection with FIG. 9 is provided with a preview interface, within which each row of the files of a target data item shows change-set information of a first change-set corresponding to a target file that is within a defined date/time range and that is closest to the opening range value of the defined date/time range, and change-set information of a second change-set corresponding to the target file that is within the defined date/time range and that is closest to the closing range value of the defined data/time range. In other words, a first change-set would be the latest change-set by the date/time which is defined by the opening range value, and a second change-set would be the latest change-set by the date/time that is defined by the closing range value. The displayed first and second change-set information may include a change-set number, deviation status (added/deleted/modified/no change), file path, last modified user etc. In an embodiment, the first and second change-sets may be retrieved from the engineering database based on data that is retrieved either in a single retrieval step, or over multiple retrieval iterations that are repeated until the required first and second change-set data has been retrieved. The previewed deviation status of a data item may be determined based on the retrieved first and second change-sets. For example, if the check-in status of the first change-set is "added" and the check-in status of the second change-set is "modified" then the previewed deviation status will be "modified". FIG. 9 illustrates an exemplary preview window 900 of the type described above, which allows users to preview the deviation status of selected target engineering items. For instance, row 1 illustrates with respect to a selected target engineering item process_IO_1, the deviation status is "modified" based on the deviation status of the first change-set (change set 1) and the second change set (change set 17). FIG. 10 illustrates retrieval of change-sets based on defined date/time ranges, in the manner described above. For instance, in one scenario, based on the defined date/time range, change-set 400 is the latest change-set by the opening range value/is the closet to the opening range value, and change-set 500 is the latest by the closing range value/is the closet to the closing range value, and as a result, change-set 400 and change-set 500 will be selected as the first change-set and second change-set, respectively. Subsequently, engineering data files will be retrieved from change-set 400 and change-set 500, respectively for deviation analysis.

Figure 7A:
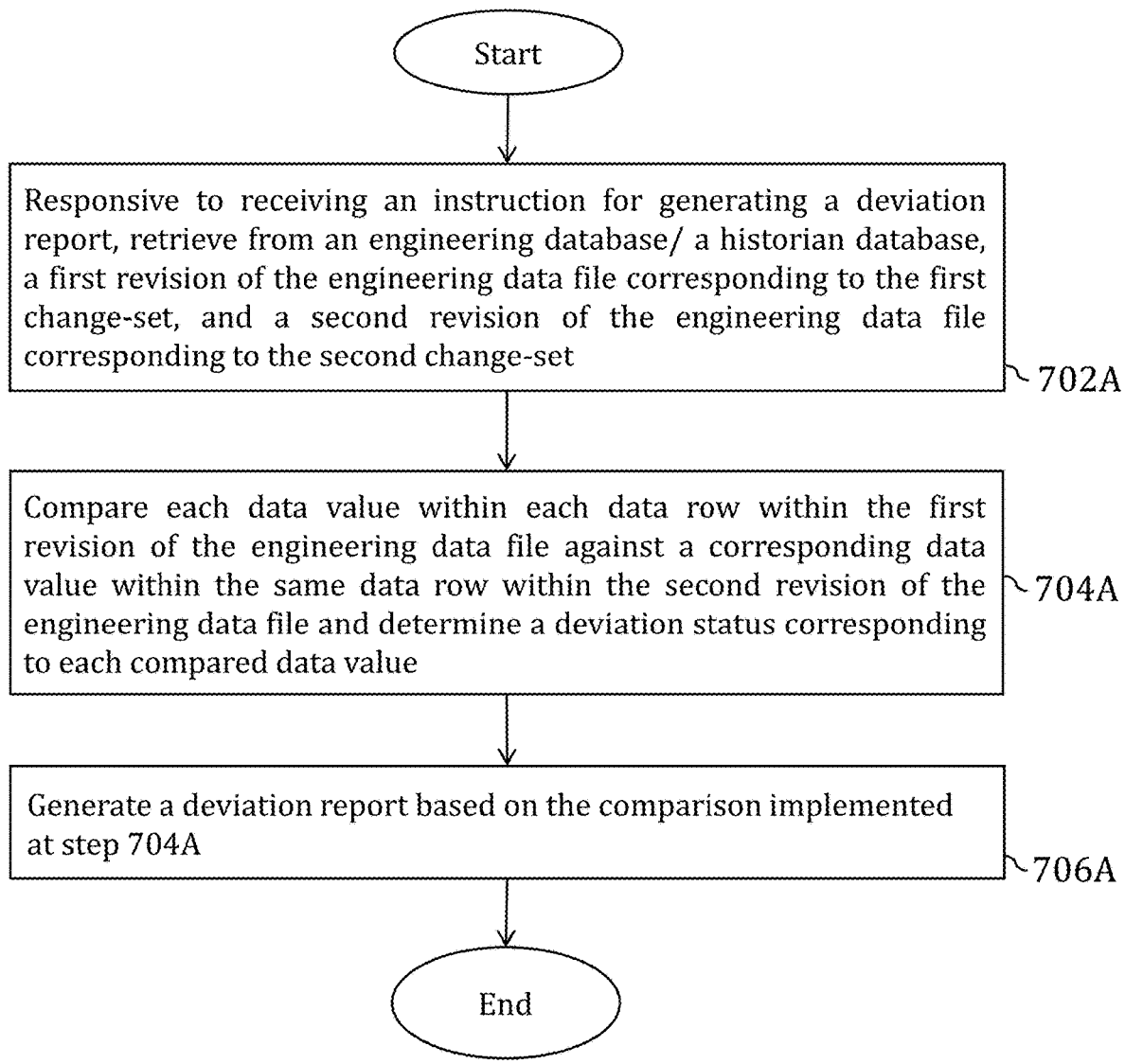
FIGS. 7A and 7B are flowcharts illustrating methods of generating a deviation report.

FIG. 7A is a flowchart illustrating a first method of generating a deviation report. In an embodiment, the method of FIG. 7A may be implemented subsequent to implementing the method of FIG. 6. In a particular embodiment, the method of FIG. 7A may be implemented where a data file in respect of which the deviation report is being generated is a non-graphic data file. In one or more embodiments, one or more method steps of the method of FIG. 7A are implemented within automated revision comparison system 504 of FIG. 5, or within data comparator 5066 of FIG. 5.

Step 702A comprises responding to receiving an instruction for generating a deviation report, by retrieving from a historian database or engineering database, a first revision of the engineering data file corresponding to a first change-set (the first change-set of FIG. 6), and a second revision of the engineering data file corresponding to a second change-set (the second change-set of FIG. 6). In an embodiment, the instruction may be received through user interface 5062 of FIG. 5.

Step 704A comprises comparing each data value (or property value) within each data row within the first revision of the engineering data file against a corresponding data value within the same data row within the second revision of the engineering data file and determining a deviation status corresponding to each compared data value. Step 704A may in an embodiment be implemented within data comparator 5066 of FIG. 5.

Step 706A comprises generating (and optionally displaying) a deviation report based on the comparison implemented at step 704A. In an embodiment, generating deviation report of step 706A may be implemented at report generator 5068 of FIG. 5.

In implementing the method of FIG. 7A, it would be understood that when the configuration engineer initiates generation of the deviation report (by providing an input instructing generation of the report) subsequent to implementing the method of FIG. 6, the steps of comparing two revisions of a data file is commenced.

Figure 11:
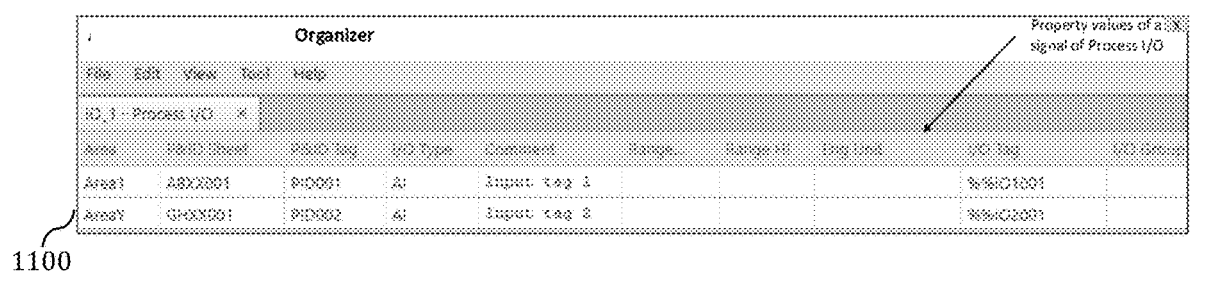
Figure 19:
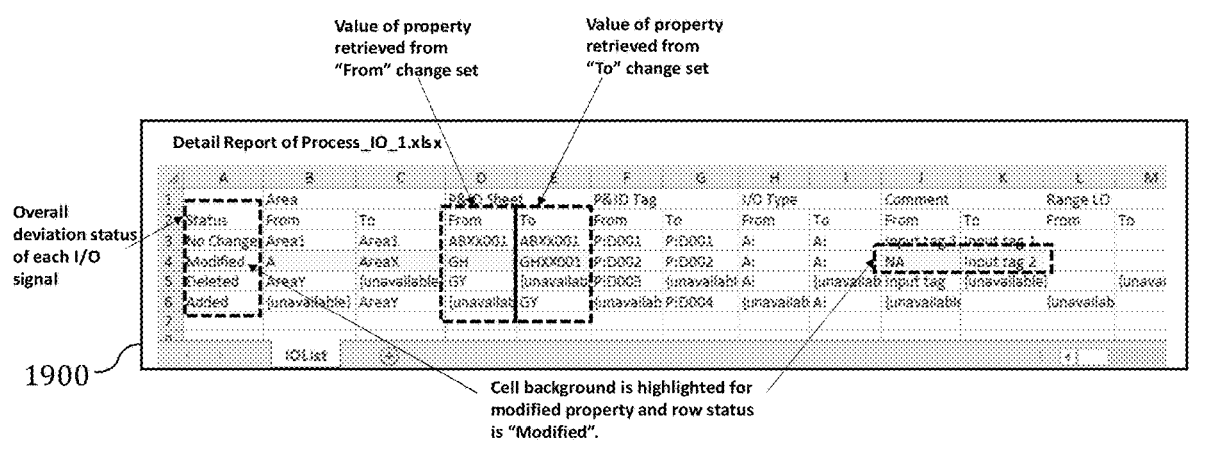

Upon retrieving the first and second revisions of the data file from the first change-set and the second change set, all data values of each data row within the first revision are compared with data values of said data row in the second revision of the same file—to determine deviations in specific data values. FIG. 11 illustrates an exemplary screenshot of a user interface table 1100 showing exemplary data values or property values of data rows within a data file, of the kind that are compared in the method of FIG. 7A. In addition to a comparison of data values within a data row, each data row itself may also be compared to determine whether there is a deviation in a data row. In an embodiment, a determination concerning whether there is a deviation in a data row is based on identifying the existence of a data row within the second revision that is not included within the first revision. Any modification or deviation detected between data values corresponding to a data row, or any deviation in a data row as a whole will be reflected in the generated deviation report. FIG. 19 illustrates an exemplary deviation report 1900 of process I/O that may be generated based on implementation of the method of FIG. 7A. As shown in FIG. 19, column D represents values of properties of files retrieved from "from change set", (i.e. a first change-set), column E represents values of properties of files retrieved from "to change set" (i.e. a second change-set), values of properties of files retrieved from the first change-set and from the second change-set are listed out and compared, and the overall deviation status of each I/O signal is identified in column A "status".

Figure 7B:
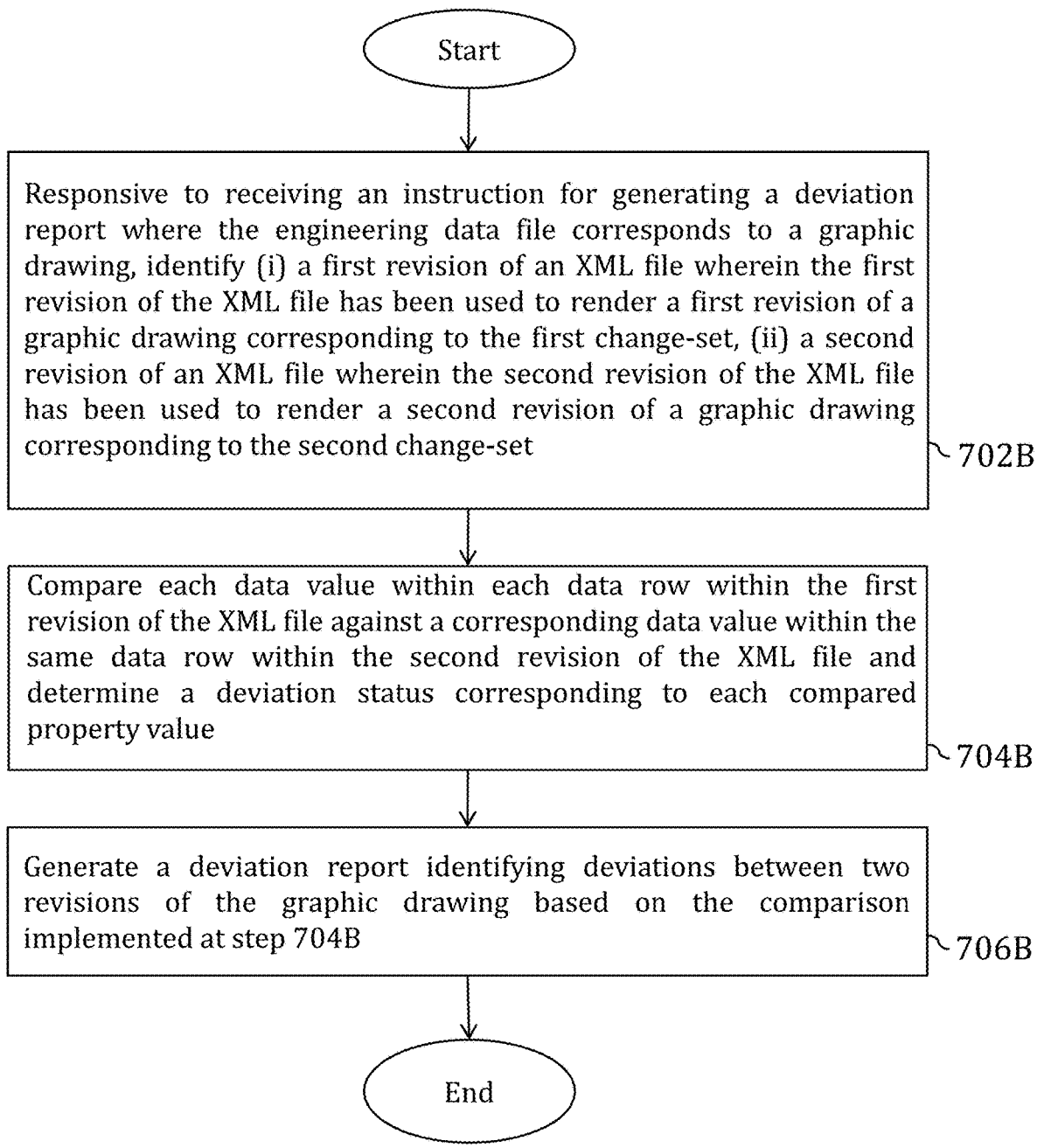

FIG. 7B is a flowchart illustrating a second method of generating a deviation report. In an embodiment, the method of FIG. 7B may be implemented subsequent to implementing the method of FIG. 6. In a particular embodiment, the method of FIG. 7B may be implemented where a data file in respect of which the deviation report is being generated corresponds to or defines a graphic drawing. In one or more embodiments, one or more method steps of the method of FIG. 7B are implemented within automated revision comparison system 504 of FIG. 5, or within data comparator 5066 of FIG. 5.

Step 702B comprises responding to receiving an instruction for generating a deviation report where the engineering data file corresponds to a graphic drawing, by identifying (i) a first revision of an XML file wherein the first revision of the XML file enables or is used to render a first revision of a graphic drawing corresponding to the first change-set, (ii) a second revision of an XML file wherein the second revision of the XML file enables or is used to render a second revision of a graphic drawing corresponding to the second change-set. Each of the first XML file and the second XML file are XML data files that are used by the process control system to define and retrievably store the corresponding revisions of the graphic drawing. In an embodiment, the instruction may be received through user interface 5062 of FIG. 5.

Step 704B comprises comparing each data value within each data row within the first revision of the XML file against a corresponding data value within the same data row within the second revision of the XML file and determining a deviation status corresponding to each compared data value. Each row within the first or second revisions XML file represents a distinct (or a single) graphic object or component, for instance, line, arc, of a graphic file, and each column within the first or second revisions of the XML file represents a distinct property or attribute of a graphic object or component, for instance, thickness of a line. Step 704B may in an embodiment be implemented within data comparator 5066 of FIG. 5.

Step 706B comprises generating a deviation report identifying deviations between the two revisions of the graphic drawing based on the comparison implemented at step 704B. In an embodiment, the deviation report of step 706B may be generated at report generator 5068 of FIG. 5. The detected deviations between the two revisions of the graphic drawing represent deviations between attributes or properties of one or more graphic objects within the graphic drawing to which the XML file (and its revisions) correspond.

Figure 12:
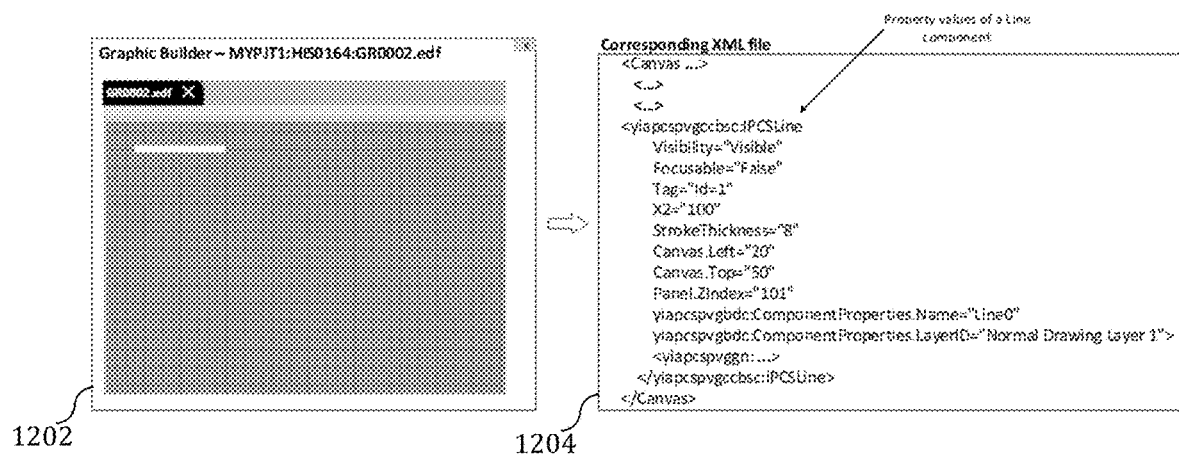
FIGS. 12 and 13 illustrate aspects of implementing the method of FIG. 7A.
Figure 13:
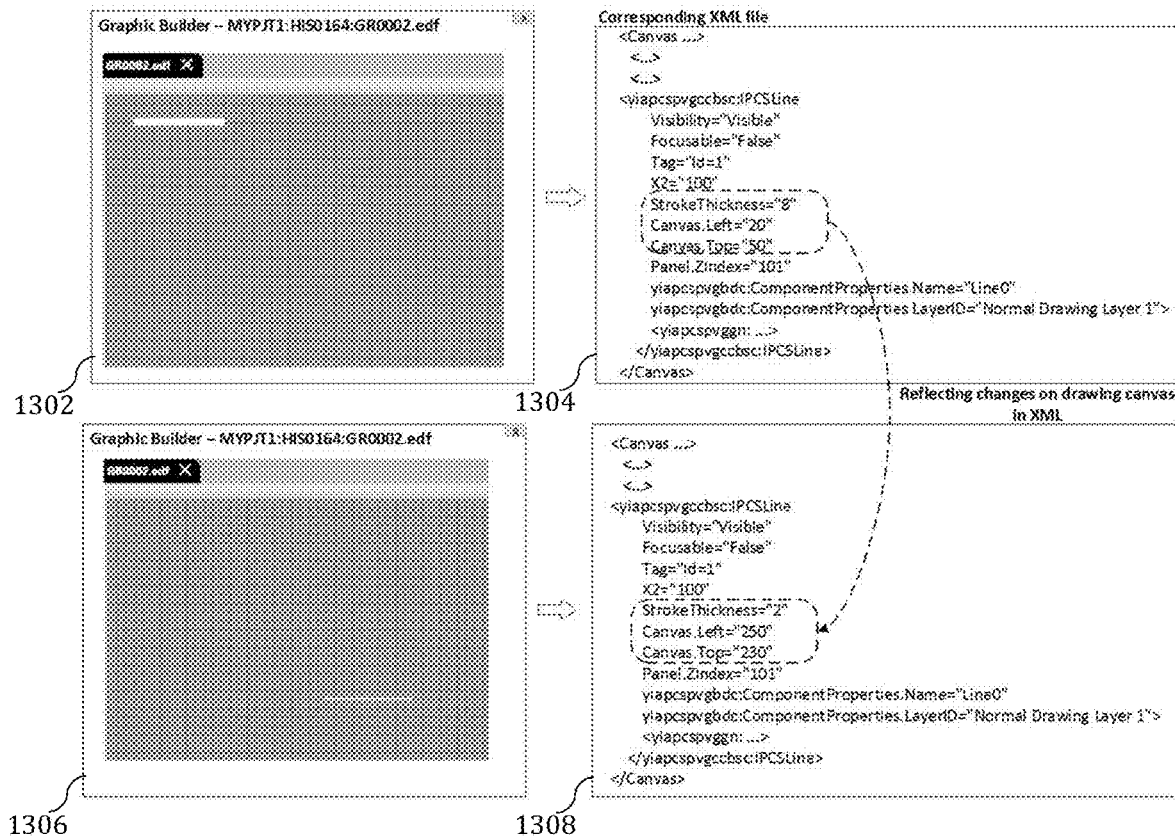

FIGS. 12 and 13 respectively illustrate the manner in which XML format files can be used within a process control system for storing data values that define a graphic drawing—such that the XML format file can be used to generate or render the graphic file, by the process control system. FIG. 12 illustrates a graphic file 1202 comprising a line component, and the corresponding XML file with code 1204 that defines the attributes of the line component, wherein said XML file can be used to generate or render the graphic file. Graphic components are stored in XML format as XAML (Extensible Application Markup Language).

FIG. 13 illustrates (i) a first revision 1302 of a graphic file comprising a line component, and the corresponding XML file with code 1304 that defines the attributes of the line component, and (ii) a second revision 1306 of a graphic file comprising a modified line component, and the corresponding XML file with code 1308 that defines the modified attributes of the modified line component. The detection of deviations between the first revision 1302 of the graphic file and the second revision 1306 of the graphic file may be implemented in accordance with the method of FIG. 7B by implementing a comparison of the corresponding underlying first and second XML files 1304 and 1308. The detected deviations between the first revision 1302 of the graphic file and the second revision 1306 of the graphic file represent deviations between attributes or properties of one or more graphic objects within the graphic file to which the XML file (and its revisions) correspond.

Figure 21:
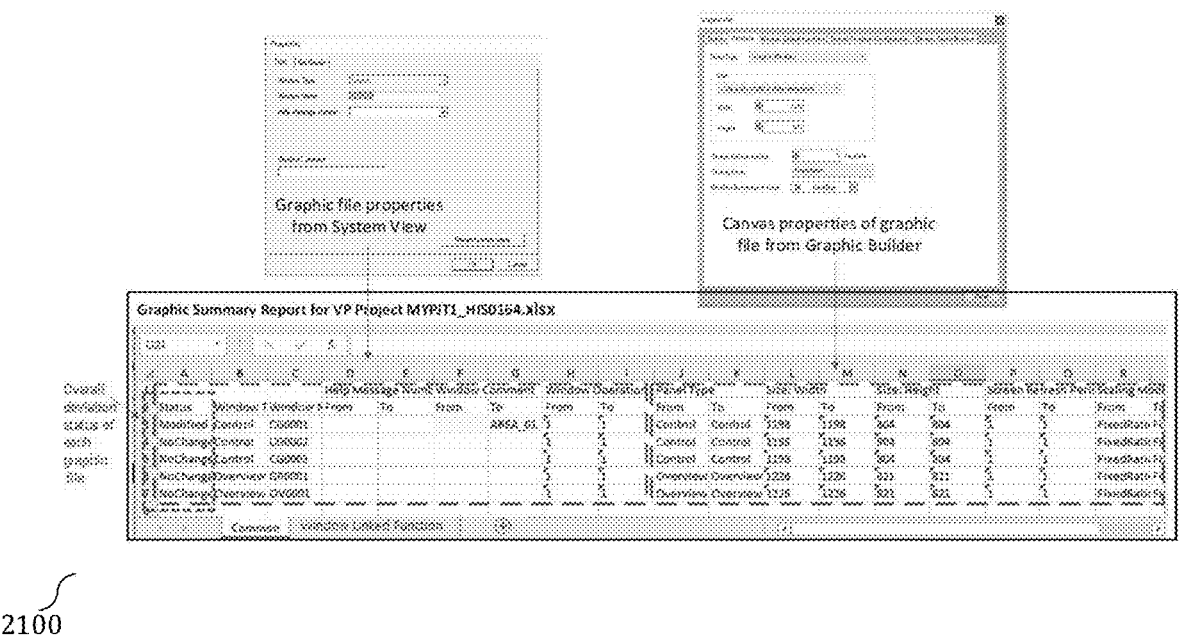
Figure 22:
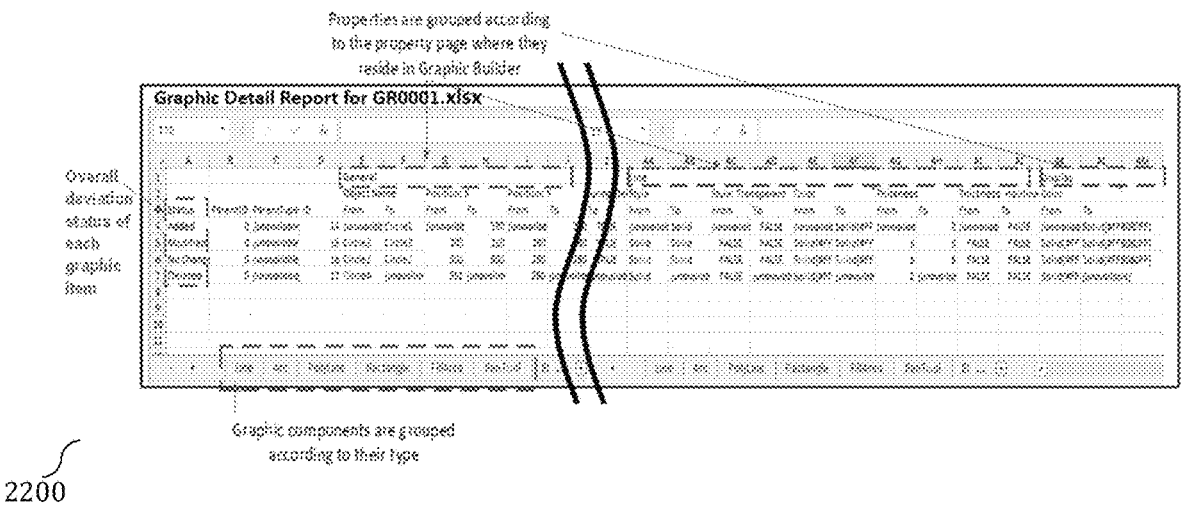

By implementing the method of FIG. 7B, the detection of deviations between different revisions of a graphic file is based on comparing data values in underlying XML representations of the revisions of said graphic file, instead of using resource intensive edge detection/pixel-based algorithms or other image comparison algorithms. The detected deviations between the revisions of the graphic file may be reflected and highlighted in deviation reports 2100, 2200 of the kind illustrated if FIGS. 21 and 22 respectively. Specifically, FIG. 21 illustrates an example of graphic summary detail report for all the graphic files under a Human Interface Station (HIS) of an engineering project. For instance, as illustrated, graphic file CG0001 is indicated as modified in column A row 3, this is due to one property of graphic file CG0001 (i.e. AREA_01) is modified. And FIG. 22 gives an example of graphic detail report of a graphic file. As shown in FIG. 22, graphic components are organized in a way that all graphic components belonging to the same type (e.g. line, arc, polyline, rectangle) are presented in the same worksheet. With respect to each worksheet of graphic detail report, each row corresponds to a single graphic component, and the different columns with each row represent the properties of the graphic component.

Figure 14:
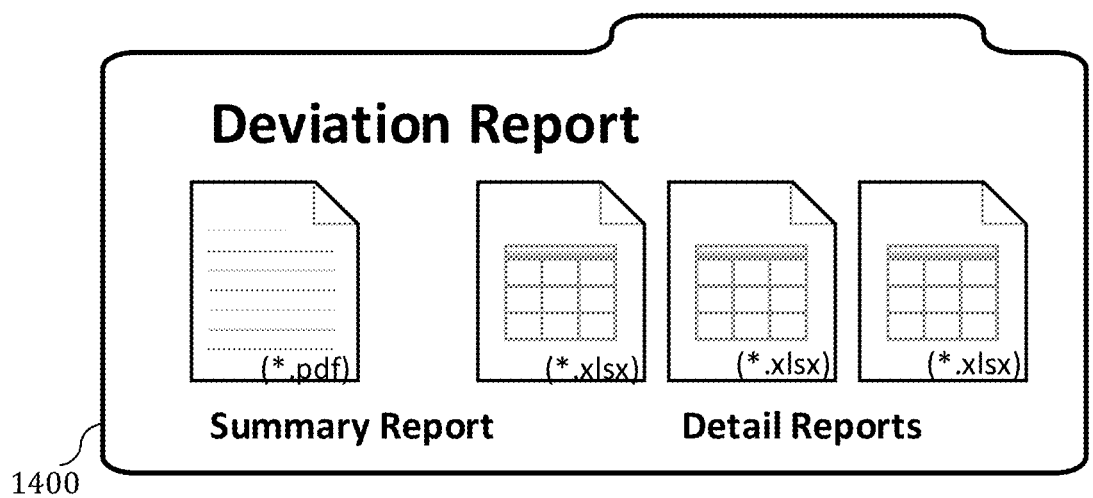
Figure 15:
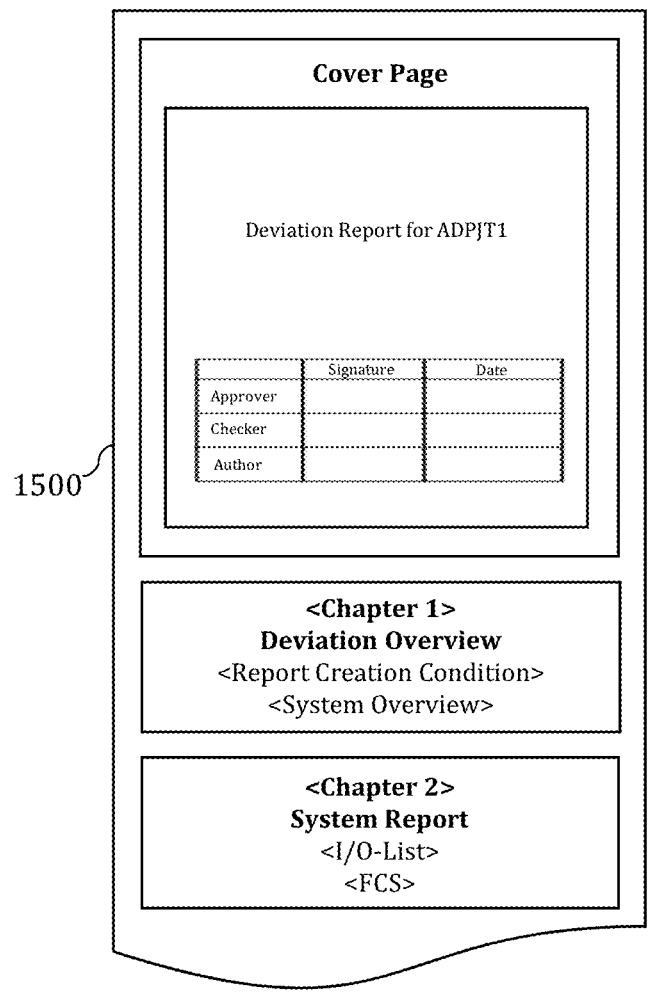
Figure 17:
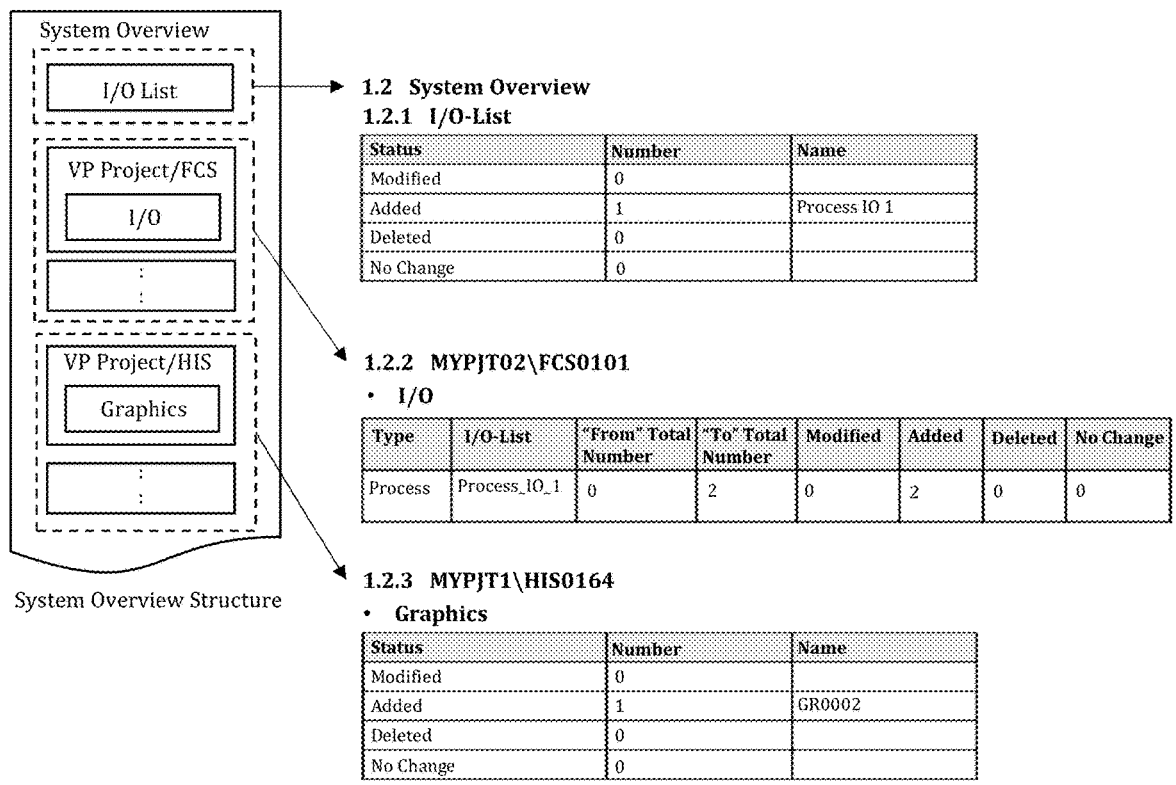
Figure 18:
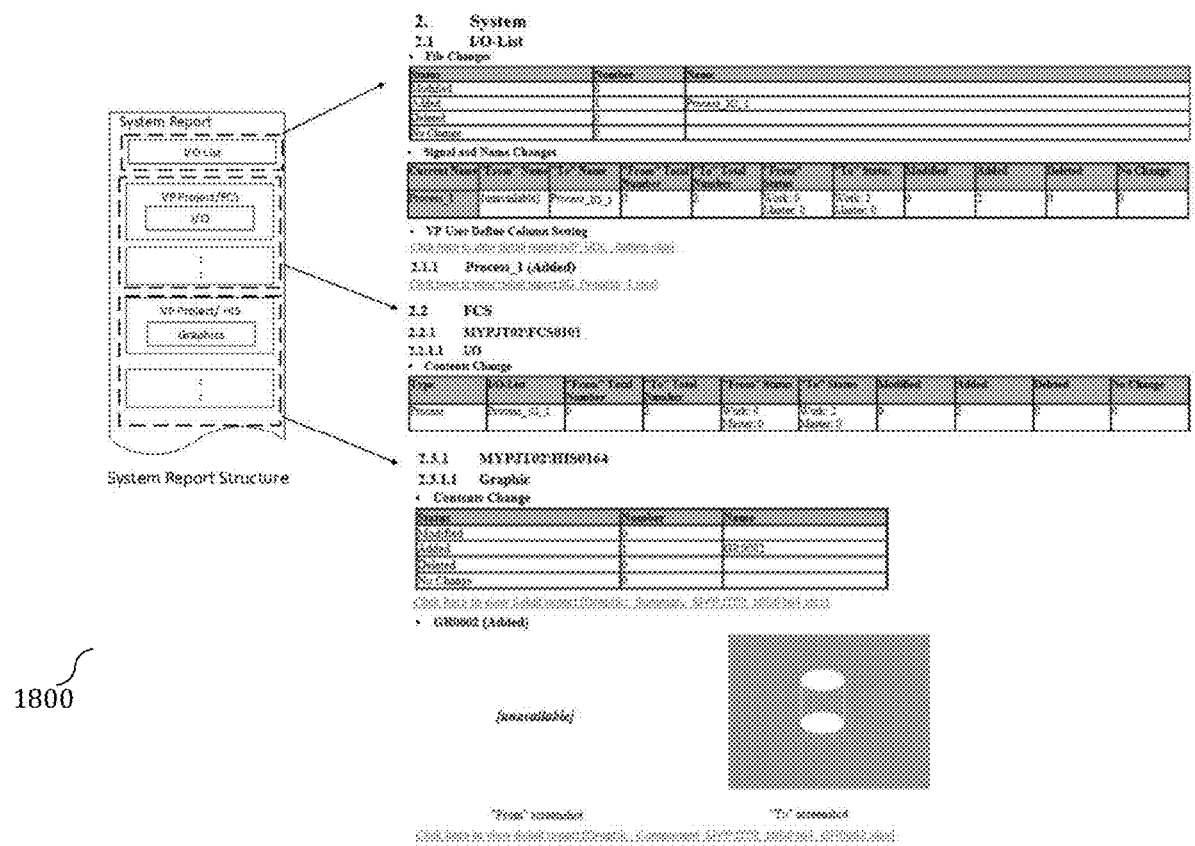

Deviation reports generated in accordance with the above described method of the present invention may consist of multiple documents including any one or more of a single summary report (for example, in pdf format), and/or multiple detail reports—for example, in xls format or spreadsheet format (see deviation report 1400 as shown in FIG. 14). As shown in FIGS. 15, 16, 17 and 18 respectively, the summary report (or components thereof) 1500, 1600, 1700, 1800 may provide a summary of deviation statuses of target items or files including any one or more of a cover page, deviation overview and system overview, screenshots of graphics, and links for detail reports. As shown in FIG. 19, each detail report 1900 contains the deviation statuses of the content of each target item or target data file.

Figure 20:
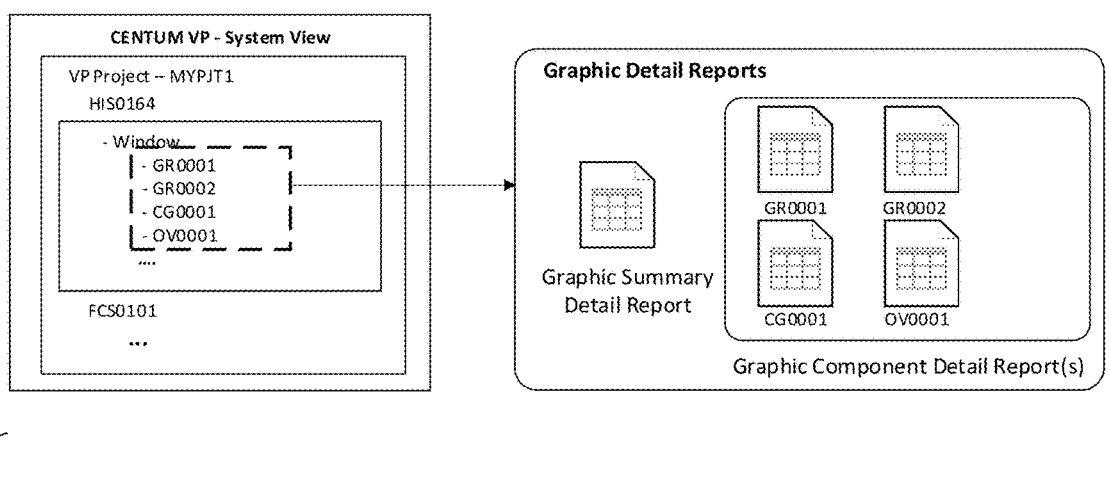

As illustrated in FIGS. 20 to 22, deviation reports 2000, 2100, 2200 based on graphic files include not only a summary detail report corresponding to the graphic files but also include component reports for graphic file components within each graphic file.

Implementing the teachings of the present invention to generate deviation reports enable configuration engineers to trace their modifications quickly and more efficiently. During factory acceptance testing, configuration engineers can generate the deviation reports, verify their changes in the reports and submit the reports to their supervisor or customer once the modifications are implemented. This has been found to significantly improve the efficiencies and time requirements of the entire factory acceptance testing process.

Figure 23:
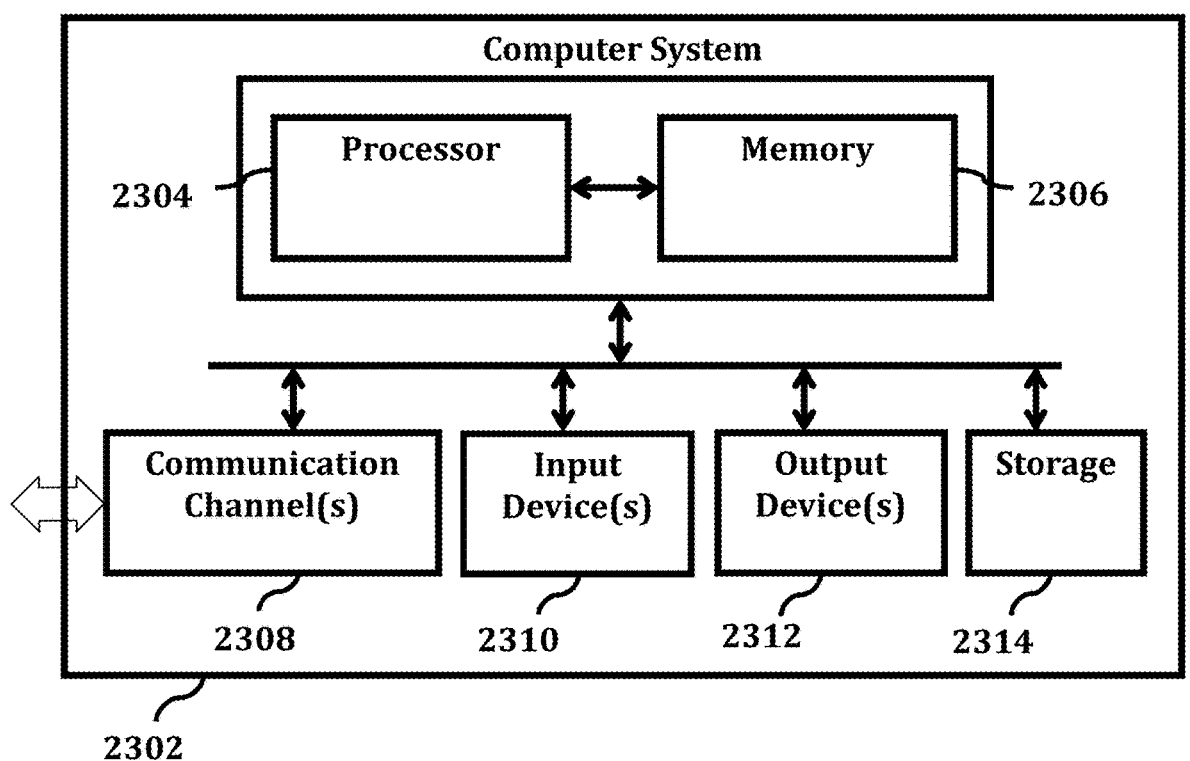
FIG. 23 illustrates an exemplary computer system according to which various embodiments of the present invention may be implemented.

FIG. 23 illustrates an exemplary computer system according to which various embodiments of the present invention may be implemented.

System 2300 includes computer system 2302 which in turn comprises one or more processors 2304 and at least one memory 2306. Processor 2304 is configured to execute program instructions—and may be a real processor or a virtual processor. It will be understood that computer system 2302 does not suggest any limitation as to scope of use or functionality of described embodiments. The computer system 2302 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 2302 in accordance with the present invention may include one or more servers, desktops, laptops, tablets, smart phones, mobile phones, mobile communication devices, tablets, phablets and personal digital assistants. In an embodiment of the present invention, the memory 2306 may store software for implementing various embodiments of the present invention. The computer system 2302 may have additional components. For example, the computer system 2302 may include one or more communication channels 2308, one or more input devices 2310, one or more output devices 2312, and storage 2314. An interconnection mechanism (not shown) such as a bus, controller, or network, interconnects the components of the computer system 2302. In various embodiments of the present invention, operating system software (not shown) provides an operating environment for various softwares executing in the computer system 2302 using a processor 2304, and manages different functionalities of the components of the computer system 2302.

The communication channel(s) 2308 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 2310 may include, but is not limited to, a touch screen, a keyboard, mouse, pen, joystick, trackball, a voice device, a scanning device, or any another device that is capable of providing input to the computer system 2302. In an embodiment of the present invention, the input device(s) 2310 may be a sound card or similar device that accepts audio input in analog or digital form. The output device(s) 2312 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 2302.

The storage 2314 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 2302. In various embodiments of the present invention, the storage 2314 may contain program instructions for implementing any of the described embodiments.

In an embodiment of the present invention, the computer system 2302 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 2302. The method described herein is typically implemented as a computer program product, comprising a set of program instructions that is executed by the computer system 2302 or any other similar device. The set of program instructions may be a series of computer readable codes stored on a tangible medium, such as a computer readable storage medium (storage 2314), for example, diskette, CD-ROM, ROM, flash drives or hard disk, or transmittable to the computer system 2302, via a modem or other interface device, over either a tangible medium, including but not limited to optical or analogue communications channel(s) 2308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above, it will be apparent that the invention provides significant advantages over the prior art, including:

- Elimination of tasks for configuration engineers to look for their modification targets from different systems and to go through a large volume of historical records
- Reducing the risks of human error when preparing a deviation report manually
- Providing deviation reports that include not only with summary data, but also details of the detected changes/modifications/deviations (e.g. before and after values)
- Enabling engineering efficiencies during Factory Acceptance Test (FAT) and
- Preventing oversight of modifications and unnecessary modifications to engineering data by providing the deviation information efficiently.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

The invention claimed is:

1. A processor implemented method for generating a deviation report identifying modifications made to engineering data within a process control system, the method comprising:
    receiving user input defining a set of data retrieval parameters that identify change-set data for an engineering data file, the set of data retrieval parameters including at least an opening range value and a closing range value defining a range of change-sets corresponding to the engineering data file;
    retrieving from among the change-sets falling within the defined range, a first change-set closest to the opening range value, and a second change-set closest to the closing range value;
    retrieving from an engineering database, a first revision of the engineering data file corresponding to the first change-set;
    retrieving from the engineering database, a second revision of the engineering data file corresponding to the second change-set;
    comparing data values within data rows in the first revision of the engineering data file against corresponding data values within the same data rows in the second revision of the engineering data file, and identifying any deviations corresponding to each compared data value or data row; and
    displaying a deviation report on a display, wherein the deviation report is generated based on the deviations identified based on the comparison of data values from the first revision of the engineering data file and the second revision of the engineering data file,
    wherein the engineering data file is a graphic file representing a graphic drawing corresponding to engineering data within the process control system,
    wherein the first revision of the engineering data file that is retrieved from the engineering database comprises a first revision of an XML file that defines the attributes of the graphic drawing, the first revision of the XML file corresponding to the first change-set, wherein the second revision of the engineering data file that is retrieved from the engineering database comprises a second revision of the XML file that defines the attributes of the graphic drawing, the second revision of the XML file corresponding to the second change-set, wherein each data row within the first revision and the second revision of the XML files represents a distinct graphic object within the graphic drawing, and wherein each column within the first revision and the second revision of the XML files represents a distinct attribute of a graphic object within the graphic drawing.

2. The method as claimed in claim 1, wherein the retrieval of the first and second revisions of the engineering data file is preceded by the steps of:

parsing each of the first change-set and the second change-set; and detecting a deviation status between the first and second revisions of the engineering data file based on a comparison of data within the second change-set with data within the first change-set.

3. The method as claimed in claim 2, wherein:

each of the first change-set and the second change-set includes at least:

a unique change-set identifier; and a deviation status representing a category of a data file revision which such change-set records; and parsing each of the first change-set and the second change-set comprises:

retrieving a first unique change-set identifier and a first category of a data file revision, each corresponding to the first change-set; and retrieving a second unique change-set identifier and a second category of a data file revision, each corresponding to the second change-set.

4. The method as claimed in claim 3, wherein detecting the deviation status between the first and second revisions of the engineering data file comprises:

ascertaining whether a deviation status of a later change-set among the first and second change-sets is different from a deviation status of an earlier change-set among the first and second change-sets; and responsive to ascertaining that the deviation status of the later change-set is different from the deviation status of the earlier change-set, determining that the deviation status between the first and second revisions of the engineering data file represents a deviation between the two change-sets.

5. The method as claimed in claim 4, wherein the deviation status between the first and second revisions of the engineering data file is determined prior to the analysis of contents of either one of the first and second revisions of the engineering data file.

6. The method as claimed in claim 5, further comprising displaying the detected deviation status on the display as a preview deviation status between the first and second revisions of the engineering data file.

7. The method as claimed in claim 1, wherein:

the first revision of the XML file enables rendering of a first revision of the graphic drawing; and the second revision of the XML file enables rendering of a second revision of the graphic drawing.

8. The method as claimed in claim 7, wherein identifying any deviations corresponding to each compared data value or data row comprises comparing data values within data rows in the first revision of the XML file against corresponding data values within the same data rows in the second revision of the XML file, and the deviations identified represent deviations between attributes of the distinct graphic object within the graphic drawing.

9. A system for generating a deviation report identifying modifications made to engineering data within a process control system, the system comprising:

a memory; and a processor configured for:

receiving user input defining a set of data retrieval parameters that identify change-set data for an engineering data file, the set of data retrieval parameters including at least an opening range value and a closing range value defining a range of change-sets corresponding to the engineering data file;

retrieving from among the change-sets falling within the defined range, a first change-set closest to the opening range value, and a second change-set closest to the closing range value;

retrieving from an engineering database, a first revision of the engineering data file corresponding to the first change-set;

retrieving from the engineering database, a second revision of the engineering data file corresponding to the second change-set;

comparing data values within data rows in the first revision of the engineering data file against corresponding data values within the same data rows in the second revision of the engineering data file, and identifying any deviations corresponding to each compared data value or data row; and displaying a deviation report on a display, wherein the deviation report is generated based on the deviations identified based on the comparison of data values from the first revision of the engineering data file and the second revision of the engineering data file, wherein the engineering data file is a graphic file representing a graphic drawing corresponding to engineering data within the process control system, wherein the first revision of the engineering data file that is retrieved from the engineering database comprises a first revision of an XML file that defines the attributes of the graphic drawing, the first revision of the XML file corresponding to the first change-set, wherein the second revision of the engineering data file that is retrieved from the engineering database comprises a second revision of the XML file that defines the attributes of the graphic drawing, the second revision of the XML file corresponding to the second change-set, wherein each data row within the first revision and the second revision of the XML files represents a distinct graphic object within the graphic drawing, and wherein each column within the first revision and the second revision of the XML files represents a distinct attribute of a graphic object within the graphic drawing.

10. The system as claimed in claim 9, wherein the processor is configured such that retrieval of the first and second revisions of the engineering data file is preceded by:

parsing each of the first change-set and the second change-set; and detecting a deviation status between the first and second revisions of the engineering data file based on a comparison of data within the second change-set with data within the first change-set.

11. The system as claimed in claim 10, wherein the processor is configured such that:

each of the first change-set and the second change-set includes at least:

a unique change-set identifier; and a deviation status representing a category of a data file revision which such change-set records; and parsing each of the first change-set and the second change-set comprises:
retrieving a first unique change-set identifier and a first category of a data file revision, each corresponding to the first change-set; and
retrieving a second unique change-set identifier and a second category of a data file revision, each corresponding to the second change-set.

12. The system as claimed in claim 11, wherein the processor is configured such that detecting the deviation status between the first and second revisions of the engineering data file comprises:
ascertaining whether a deviation status of a later change-set among the first and second change-sets is different from a deviation status of an earlier change-set among the first and second change-sets; and
responsive to ascertaining that the deviation status of the later change-set is different from the deviation status of the earlier change-set, determining that the deviation status between the first and second revisions of the engineering data file represents a deviation between the two change-sets.

13. The system as claimed in claim 12, wherein the processor is configured such that the deviation status between the first and second revisions of the engineering data file is determined prior to the analysis of contents of either one of the first and second revisions of the engineering data file.

14. The system as claimed in claim 13, wherein the processor is configured to display the detected deviation status on the display as a preview deviation status between the first and second revisions of the engineering data file.

15. The system as claimed in claim 9, wherein the processor is configured such that:
the first revision of the XML file enables rendering of a first revision of the graphic drawing; and
the second revision of the XML file enables rendering of a second revision of the graphic drawing.

16. The system as claimed in claim 15, wherein the processor is configured for identifying any deviations corresponding to each compared data value or data row by comparing data values within data rows in the first revision of the XML file against corresponding data values within the same data rows in the second revision of the XML file, and the deviations identified represent deviations between attributes of the distinct graphic object within the graphic drawing.

17. A computer program product for generating a deviation report identifying modifications made to engineering data within a process control system, the computer program product comprising a non-transitory computer usable medium having a computer readable program code embodied therein, the computer readable program code comprising instructions for implementing within a processor based computing system, the steps of:
receiving user input defining a set of data retrieval parameters that identify change-set data for an engineering data file, the set of data retrieval parameters including at least an opening range value and a closing range value defining a range of change-sets corresponding to the engineering data file;
retrieving from among the change-sets falling within the defined range, a first change-set closest to the opening range value, and a second change-set closest to the closing range value;
retrieving from an engineering database, a first revision of the engineering data file corresponding to the first change-set;
retrieving from the engineering database, a second revision of the engineering data file corresponding to the second change-set;
comparing data values within data rows in the first revision of the engineering data file against corresponding data values within the same data rows in the second revision of the engineering data file, and identifying any deviations corresponding to each compared data value or data row; and
displaying a deviation report on a display, wherein the deviation report is generated based on the deviations identified based on the comparison of data values from the first revision of the engineering data file and the second revision of the engineering data file,
wherein the engineering data file is a graphic file representing a graphic drawing corresponding to engineering data within the process control system,
wherein the first revision of the engineering data file that is retrieved from the engineering database comprises a first revision of an XML file that defines the attributes of the graphic drawing, the first revision of the XML file corresponding to the first change-set,
wherein the second revision of the engineering data file that is retrieved from the engineering database comprises a second revision of the XML file that defines the attributes of the graphic drawing, the second revision of the XML file corresponding to the second change-set,
wherein each data row within the first revision and the second revision of the XML files represents a distinct graphic object within the graphic drawing, and
wherein each column within the first revision and the second revision of the XML files represents a distinct attribute of a graphic object within the graphic drawing.

18. The computer program product as claimed in claim 17 wherein:
the first revision of the XML file enables rendering of a first revision of the graphic drawing; and
the second revision of the XML file enables rendering of a second revision of the graphic drawing.

19. The computer program product as claimed in claim 17, wherein the computer readable program code comprises instructions that when implemented by the processor based computing system cause retrieval of the first and second revisions of the engineering data file to be preceded by:
parsing each of the first change-set and the second change-set; and
detecting a deviation status between the first and second revisions of the engineering data file based on a comparison of data within the second change-set with data within the first change-set.

20. The computer program product as claimed in claim 19, wherein:
each of the first change-set and the second change-set includes at least:
a unique change-set identifier; and
a deviation status representing a category of a data file revision which such change-set records; and
parsing each of the first change-set and the second change-set comprises:
retrieving a first unique change-set identifier and a first category of a data file revision, each corresponding to the first change-set; and retrieving a second unique change-set identifier and a second category of a data file revision, each corresponding to the second change-set.

21. The computer program product as claimed in claim 20, wherein detecting the deviation status between the first and second revisions of the engineering data file comprises:
    ascertaining whether a deviation status of a later change-set among the first and second change-sets is different from a deviation status of an earlier change-set among the first and second change-sets; and
    responsive to ascertaining that the deviation status of the later change-set is different from the deviation status of the earlier change-set, determining that the deviation status between the first and second revisions of the engineering data file represents a deviation between the two change-sets.

22. The computer program product as claimed in claim 21, wherein the computer readable program code comprises instructions that when implemented by the processor based computing system cause the deviation status between the first and second revisions of the engineering data file to be determined prior to the analysis of contents of either one of the first and second revisions of the engineering data file.

* * * * *